Oct. 4, 1966    C. L. MOORE ETAL    3,276,799
CABLE QUICK DISCONNECT
Filed Jan. 29, 1964

INVENTORS
Cecil L. Moore and
Jack W. McEntire
BY Lockwood, Woodard, Smith & Weikart
Attorneys

United States Patent Office 3,276,799
Patented Oct. 4, 1966

3,276,799
CABLE QUICK DISCONNECT
Cecil L. Moore, St. Louis, and Jack W. McEntire, Ferguson, Mo., assignors to E & R Laboratory Service Corporation, St. Louis, Mo., a corporation of Missouri
Filed Jan. 29, 1964, Ser. No. 340,972
3 Claims. (Cl. 287—104)

This invention relates generally to cable connectors and more particularly to means for quickly and safely disconnecting and connecting cables capable of transmitting torsional as well as tensile loads.

Many quick-disconnect devices for cables are known. Most have shortcomings which are overcome by the present invention. For example, some have protrusions and projections which make it inconvenient to pass the cable through a tube. Others carry loads through shells or rings rather than transmitting loads straight through the connector. Some are not easily used.

It is, therefore, a general object of the present invention to provide an improved cable quick-disconnect.

A further object is to provide a quick-disconnect having external surfaces symmetrical about an axis without protrusions thereon.

A further object is to provide a quick-disconnect facilitating connection of cables for transmitting tensile and torsional forces.

A further object is to provide a quick-disconnect which will remain open when opened, and closed when closed.

Described briefly, a typical embodiment of the present invention employs two shaft fittings disposed coaxially and having interlocking lugs whereby torsional as well as tensional loads can be transmitted from one fitting to the other. Each fitting is provided with means for receiving a cable end.

A first sleeve is disposed immediately adjacent the junction of the two fittings maintaining them in interlocking relationship. This sleeve is spring biased to remain in this position but can be moved axially against the spring bias to uncover the junction to accommodate separation of the two fittings.

A second sleeve is disposed around a portion of the first sleeve being coaxial therewith. Detent means are provided in one of the fittings and in the outer sleeve whereby a set of detent balls is useful to lock the inner sleeve in the junction uncovering position when desired to accommodate disconnection of the fittings from each other.

The full nature of the invention will be understood from the accompanying drawings and the following description and claims.

Figure 1:
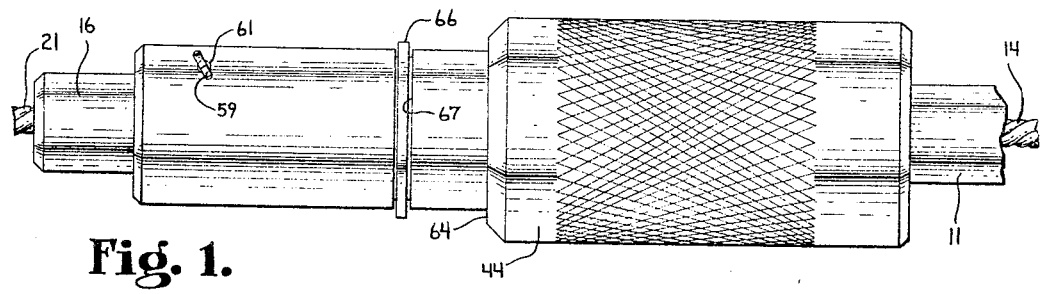
FIG. 1 is an elevational view of a typical embodiment of the present invention.
Figure 2:
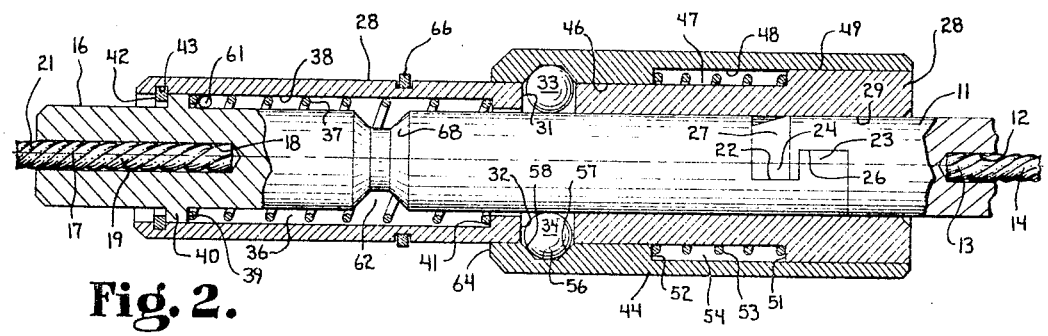
FIG. 2 is a longitudinal section through the embodiment of FIG. 1 showing it in its cable connecting condition.

Referring to the drawings in detail, and particularly FIGS. 1 and 2 thereof, a first shaft 11 is shown having a central bore 12 therein to which is secured the end portion 13 of one cable 14. The manner of connection of the cable to the fitting is not important to the present invention and will not further be described.

A second shaft 16 of the same principal diameter as shaft 11 is disposed on the same axis 17 therewith and has a central bore 18 receiving the end 19 of a second cable 21. The second shaft or fitting 16 has a transverse notch 22 and lug 23 at its distal end. The notch 22 receives the lug 24 of the fitting 11 and the lug 23 of fitting 16 is received in the transverse notch 26 of the fitting 11. These two fittings are, therefore, capable of transmitting tensile as well as torsional loads. A conical chamfer 27 is provided around the outer surface of the fitting 11 at its end to facilitate reception of the sleeve which will now be described.

To retain the junction of the interlocking ends of the fittings in assembly, a retainer in the form of a sleeve 28 is provided. This retainer is coaxial with the shafts, having an inner bore surrounding the outer surfaces of the fittings. It also has two transverse apertures 31 and 32 therein accommodating detent balls 33 and 34 respectively. More transverse apertures and detent balls may be provided if desired. The sleeve has an annular cavity 36 which accommodates the disposition of a coil spring 37 between the outer surface of the fitting 16 and the inner surface 38 of the sleeve. This spring has one end disposed in abutting engagement with an annular shoulder 39 of flange 40 which is integral with the fitting 16. Flange 40 fits the inner surface of the cavity thereby providing a guide for the sleeve when it is moved axially with respect to the fitting 16. The other end of the spring 37 abutting engages the shoulder 41 in the sleeve 28. A snap-ring 42 in the groove 43 in the sleeve abuttingly engages the annular shoulder of the fitting 16 to provide a stop to the relative motion which would otherwise be imparted by the spring 37 in compression.

A second sleeve 44 is disposed coaxially with sleeve 28. This sleeve has a first cylindrical bore 46 received on the outer cylindrical surface 47 of the first sleeve. It has a second bore 48 received on the outer cylindrical surface 49 of the sleeve 28. The step between the outer surfaces 49 and 46 of sleeve 28 provides a shoulder 51 and the step between the inner cylindrical surfaces 46 and 48 of the sleeve 44 provides a shoulder 52. A coil spring 53 is disposed in compression between the shoulders 51 and 52, the spring being located in the cavity 54 between the surfaces 47 and 48 of the sleeves 28 and 44, respectively.

Annular detent groove 56 is provided in the surface 46 of the sleeve 44 and has facing conical chamfered surfaces 57 and 58. The presence of the detent balls 33 and 34 in the apertures 31 and 32, respectively, and their extension into the annular groove 56, together with their engagement of the outer surface of the shaft 16, serves to maintain the position of the outer sleeve as shown in FIG. 2, preventing the coil spring 53 from changing the relative position of the two sleeves. Therefore, once sleeve 28 is disposed in the position shown in FIGS. 1 and 2, sleeve 44 cannot be moved from its position shown in FIG. 2. If it is desired to lock the sleeve 28 in this position, a cotter pin 59 is inserted through the aperture 61 in the sleeve 28 and by engaging the lower coil of the spring 37 which is in turn abuttingly engaging the shaft shoulder 39, it prevents axial movement of the sleeve 28 on the shaft fitting 16.

From the foregoing description, it is readily apparent that the loading in the present invention is straight-through the central members of the quick disconnect—namely the shafts 11 and 16. The sleeve 28 merely functions as a retainer and the sleeve 44 merely functions as a retainer. The opening of the quick disconnect will now be described.

Figure 3:
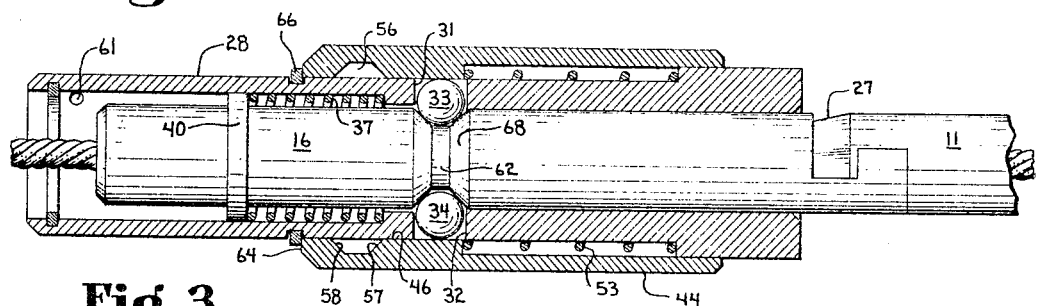
FIG. 3 is a section identical to FIG. 2 but showing the device in its cable disconnecting condition.

To open the quick disconnect, it is necessary to remove the cotter pin 59 and manually slide the inner sleeve 28 toward the shoulder 39 until the detent balls 33 and 34 are abreast of the annular groove 62 in the outer surface of the fitting 16. To do this, it requires pulling or pushing the sleeve against the compressive load of the coil spring 37. As soon as the detent balls are abreast of the shaft groove 62, they will be forced into the groove by the chamfer 57 in the annular internal groove 56 of the outer sleeve 44. When the balls have become centrally disposed in the groove 62 as shown in FIG. 3, the outer sleeve will be able to move to abutting engagement of the end 64 thereof with the stop ring 66 disposed in the groove 67 of the inner sleeve 28. Then the surface 46 of the outer sleeve will hold the balls 33 and 34 in the groove 62 which will keep the inner sleeve 28 in the position shown in FIG. 3 in spite of the closing force exerted by the coil spring 37. Consequently, the interlocking ends of the fittings 11 and 16 can be readily separated without the hazard of the inner sleeves snapping shut. There is no danger to hands or fingers during the disconnection of the cables. The sleeves will remain in the position shown in FIG. 3 until intentional manual movement of the outer sleeve away from the stop ring 16 is effected to a sufficient extent to allow the detent balls to again enter the detent groove 56 in the outer sleeve.

When it is desired to again close the coupling, all that is necessary is to manually move the outer sleeve away from the shoulder 66 to a point where the detent groove 56 is abreast of the apertures 31 and 32 in the inner sleeve. The balls can then move out of the external detent groove 62, this motion being facilitated by the chamfer 68. When the balls have moved outwardly so as to again ride on the outer cylindrical surface of the fitting 16, the sleeve 28 can move to the closed position shown in FIGS. 1 and 2.

Figure 4:
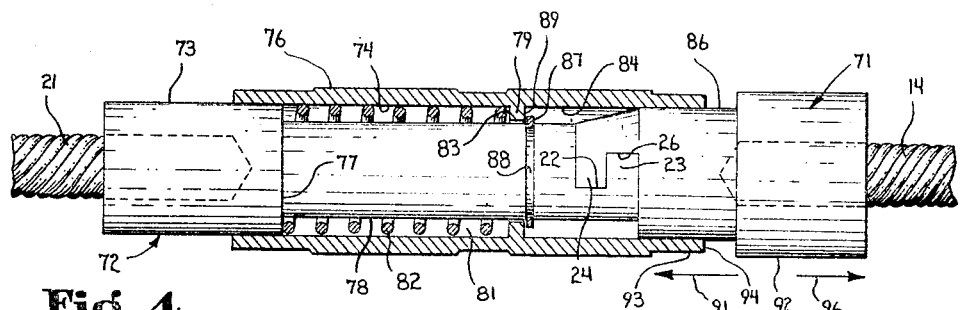
FIG. 4 is a longitudinal section through a second and simpler embodiment of the invention.

Referring now to the details of FIG. 4, there is shown a quick disconnect incorporating some features of the present invention. Fitting 71 is secured to the cable 14 whereas fitting 72 is secured to the cable 21. As in the case of the previously described embodiment, this may be done by any simple means.

These two fittings have interlocking portions similar to those in the previously described embodiment, and these portions are, therefore, given the same reference numerals. However, the fittings in this embodiment are otherwise considerably different than in the previous embodiment. For example, fitting 72 has the outer cylindrical surface 73 on which slides the inner cylindrical surface 74 of the sleeve 76. Fitting 72 also has the second outer cylindrical surface 78 of lesser diameter than the surface 73, with the shoulder 77 located at the step between the surfaces. An annular flange 79 extends inwardly from the inner cylindrical surface 74 of the sleeve and, together with the surfaces 74, 77, and 78, forms a sort of cylindrical space 81 in which a coil spring 82 is disposed, the opposite ends of the coil spring abuttingly engaging the shoulder 77 of the fitting and the shoulder 83 of the flange.

From the foregoing description, it can be recognized that the present invention is ideally adapted to a variety of applications. It is excellent for holding special tool bits used on the end of flexible shafts. It can be used to hold lanyards and the like in spececraft or similar devices when lanyards are used to release various connections or to sequentially activate systems such as pyrotecnic devices.

The advantages of the present invention in the commercial field are particularly apparent for such uses as on cables in oil fields for pulling pipe and drill bits, as well as for many other applications.

From the foregoing description, it can readily be recognized that the use of the device is not limited to applications where cables are attached to both fittings or even to one fitting, for that matter. Moreover, the specific structure can be varied within the scope of the invention.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

An inner cylindrical surface 84 extends beyond the flange 79 and embraces the outer cylindrical surface 86 of the fitting 71. Therefore, the sleeve 76, when in the position shown in FIG. 4, securely retains the locking engagement between the interlocking portions of the two fittings 71 and 72.

In order to limit the axial travel of the sleeve 76 in the direction of travel caused by the spring 82, a snap ring 87 is disposed in the groove 88. This snap ring is abuttingly engaged by the shoulder 89 of the flange 79 when the sleeve has been advanced by the coil spring to the position shown in FIG. 4, where the sleeve will securely retain the two fittings together.

From the description to this point, it should be apparent that the two fittings can be separated when the sleeve is manually moved in the direction of the arrow 91 to an extent sufficient to allow the interlocking portions of the fitting 71 to move radially away from the interlocking portions of the fitting 72. However, to prevent accidental movement of the sleeve in the direction of the arrow 91 with respect to the fittings, the fitting 71 has an enlarged portion whose outer cylindrical surface 92 is of a diameter equal to or greater than the outside diameter of the outer cylindrical surface 93 of the sleeve. Therefore, the cables and quick disconnect can be safely moved in the direction of the arrow 96, as an assembly, without the hazard of the front edge 94 of the retainer sleeve striking an obstruction while the assembly is moved and thereupon becoming released accidentally.

From the foregoing description, it can be recognized that the present invention is ideally adapted to a variety of applications. It is excellent for holding special tool bits used on the end of flexible shafts. It can be used to hold lanyards and the like in spacecraft or similar devices when lanyards are used to release various connections or to sequentially activate systems such as pyrotechnic devices.

The advantages of the present invention in the commercial field are particularly apparent for such uses as on cables in oil fields for pulling pipe and drill bits, as well as for many other applications.

From the foregoing description, it can readily be recognized that the use of the device is not limited to applications where cables are attached to both fittings or even to one fitting, for that matter. Moreover, the specific structure can be varied within the scope of the invention.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A quick disconnect comprising: a first fitting for connection to a first force transmitting member; a second fitting for connection to a second force transmitting member; interlocking means on the ends of said fittings and interlocking with each other and accommodating transmission of force from said first fitting to said second fitting; a first sleeve encircling said first and second fittings, said first sleeve having a retainer portion with an inner surface in close circumferentially engageable relationship to the outer surfaces of said first and second fittings adjacent the interlocking means of said fittings when said sleeve is in a first position, said first sleeve being slidable on one of said fittings from said first position to a second position wherein said retainer portion is away from the interlocking means thereby completely exposing the outer surface of the other of said fittings at said interlocking means; sleeve detent means in said first sleeve and engagable with fitting detent means in one of said fittings when said first sleeve is in said second position; and a second sleeve disposed on said first sleeve and disposable in a position to maintain engagement of the sleeve detent means with the fitting detent means to retain said first sleeve in said second position.

2. A quick disconnect device comprising: a first fitting connected to a first load transmitting member; a second fitting connected to a second load transmitting member; said first and second fittings having interlocking means at adjacent ends thereof, and said first and second fittings being disposed colinearly; a first retainer movable on one of said fittings between a first position retaining the ends of said fittings in interlocking engagement and a second position accommodating separation of the interlocking ends of said fitting; means biasing said first retainer to said first position; a circular row of detent balls on said first retainer and operable with a first circumferential detent groove on one of said fittings when said first retainer is in said second position to retain said retainer in said second position; and a detent retainer to retain said detent balls in said first retainer retaining position while said first retainer is in said second position, said detent balls being alternately operative to retain said second retainer in locked relationship to said first retainer when said first retainer is in said first position.

3. A quick disconnect device for providing an easily releasable load transmitting connection between a first cable and a second cable and comprising: a first shaft-like fitting affixed to one of said load transmitting members and having a lug and notch at one end thereof with a tensile load transmitting surface normal to the axis of said fitting and having a torsional load transmitting surface parallel to the axis of said fitting, said fitting having a generally cylindrical outer surface; a second shaft-like fitting affixed to the second load transmitting member, said second fitting having a generally cylindrical outer surface of the same cross sectional dimensions as of said first fitting, and said second fitting having a lug and a notch adjacent one end thereof with the lug having a tensile load transmitting surface normal to the axis of said second fitting and having a torsional load transmitting surface parallel to the axis of said second fitting, the tensile load transmitting surface of said second fitting being abuttingly engaged with the tensile load transmitting surface of said first fitting, and the torsional load transmitting surface of said second fitting being abuttingly engaged with the torsional load transmitting surface of said first fitting, said second fitting having an annular detent groove intermediate its ends with said groove having a ramp between the bottom of said groove and the said outer cylindrical surface of said second fitting, and said second fitting having an annular external flange on its outer cylindrical surface between said detent groove and the end connected to the load transmitting member; the first and second fittings having colinear axes; a first elongated sleeve coaxial with said first and second fittings and having a retainer portion with a first cylindrical bore received on both the outer cylindrical surface of said second fitting and the outer cylindrical surface of said first fitting adjacent the interengageable end portions of said fittings and retaining said fittings together, said first sleeve having a cylindrical second bore of greater diameter than the first bore and having an axis colinear with the axis of the first bore, said second bore being received on the cylindrical surface of the flange of said second fitting and guidable thereby, said second bore having an internal shoulder at one end thereof and having an annular groove near the other end thereof, and said first sleeve having a transverse aperture in a wall thereof, and said first sleeve having a first cylindrical exterior surface extending a portion of its length and a second cylindrical exterior surface of lesser diameter extending a second portion of its length with an external shoulder being disposed at the junction of the first and second external cylindrical surfaces; a second generally cylindrical sleeve having a first inner cylindrical surface received on the first exterior cylindrical surface of said first sleeve and guidingly slidable thereon, and said second sleeve having a second internal cylindrical surface received on the second external cylindrical surface of said first sleeve, said second sleeve having an internal shoulder at the junction of said first and second internal cylindrical surfaces thereof and said second sleeve having an annular groove in the second internal cylindrical surface thereof; a first coil spring having one end abuttingly engaging the external shoulder of said first sleeve and having the other end engaging the internal shoulder of said second sleeve, said first spring being compressed between said shoulders and disposed in a chamber defined by said shoulders and portions of the first internal cylindrical surfaces of said second sleeve and the second external cylindrical surface of said first sleeve; a second coil spring having one end engaging the internal shoulder in said first sleeve and having the other end abuttingly engaging the shoulder of the flange of said second fitting, said second spring being compressed between said shoulders and disposed in a chamber defined by the internal shoulder of said first sleeve and the flange shoulder of said second fitting and by the second internal cylindrical surface of said first sleeve and a portion of the external cylindrical surface of said second fitting; a movable detent member disposed in said transverse aperture with a portion thereof received in the annular groove in said second sleeve and preventing relative axial movement between said second sleeve and said first sleeve, a portion of said detent member being receivable by the annular groove in said second fitting when said first sleeve is moved axially to a position of registry of said detent member with said annular groove in said second fitting, the detent member thereupon being movable out of the annular groove in said second sleeve to accommodate relative axial motion between said first sleeve and said second sleeve; and a locking pin received generally transversely through a portion of said first sleeve and abuttingly engageable with a transverse abutment longitudinally restrained by the external flange of said second fitting, to prevent axial movement of said first sleeve on said second fitting.

References Cited by the Examiner

UNITED STATES PATENTS

| | | | |
|---|---|---|---|
| 1,372,905 | 3/1921 | Renfro | 287—104 |
| 1,923,025 | 8/1933 | Morse et al. | |
| 2,328,294 | 8/1943 | Potter | 287—104 |
| 2,399,133 | 4/1946 | Midling | 287—104 |
| 2,656,203 | 10/1953 | Musser | 287—76 |
| 2,759,745 | 8/1956 | La Mar | 287—104 |
| 2,837,370 | 6/1958 | Stott et al. | |
| 3,066,632 | 12/1962 | Bemis. | |
| 3,094,345 | 6/1963 | Gaylord | 287—76 |

CARL W. TOMLIN, *Primary Examiner.*

I. B. TALTON, D. W. AROLA, *Assistant Examiners.*